(No Model.)  2 Sheets—Sheet 1.
Z. DAVIS.
VAPOR STOVE.
No. 313,925. Patented Mar. 17, 1885.
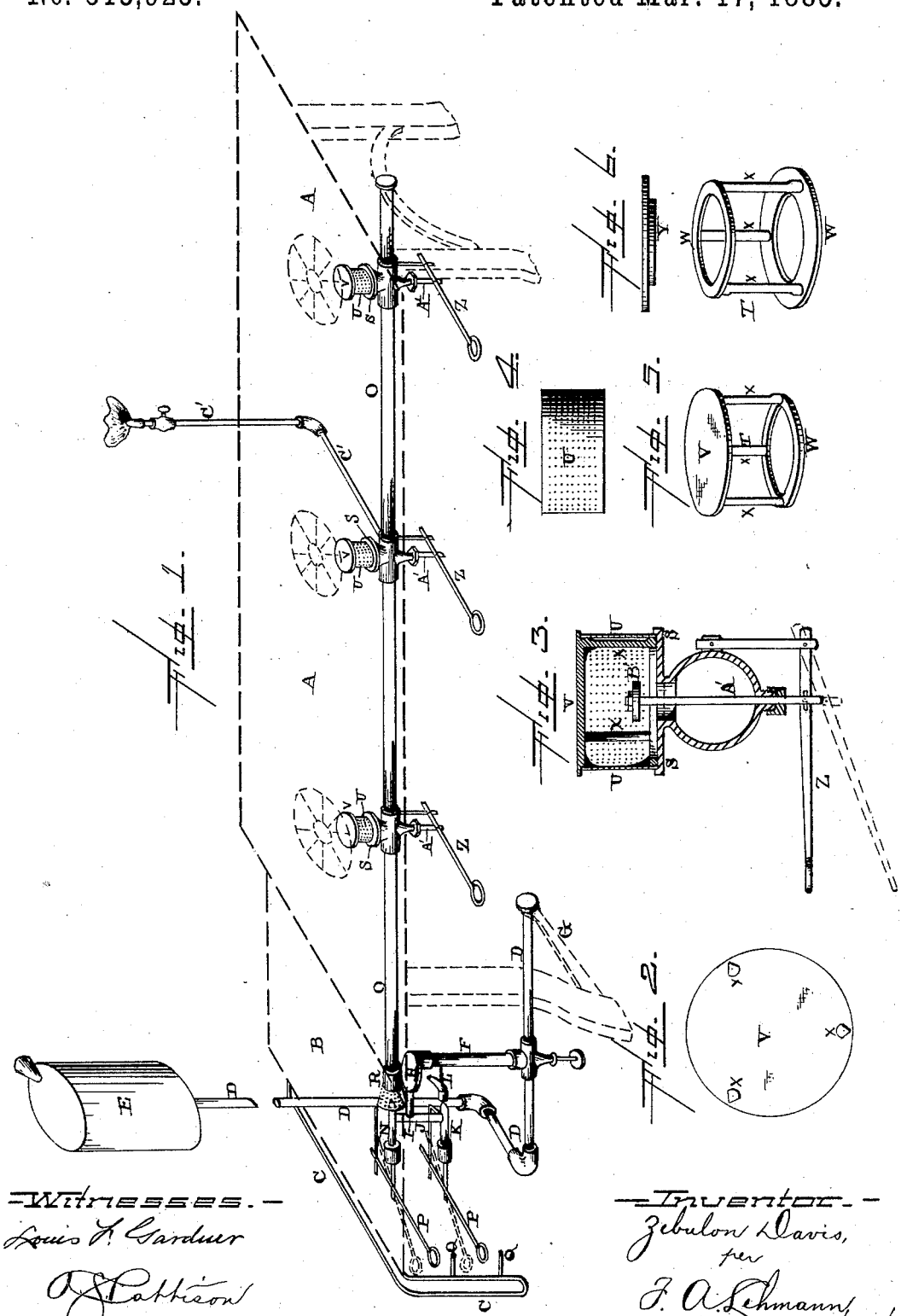

(No Model.)
Z. DAVIS.
VAPOR STOVE.
No. 313,925. Patented Mar. 17, 1885.
2 Sheets—Sheet 2.
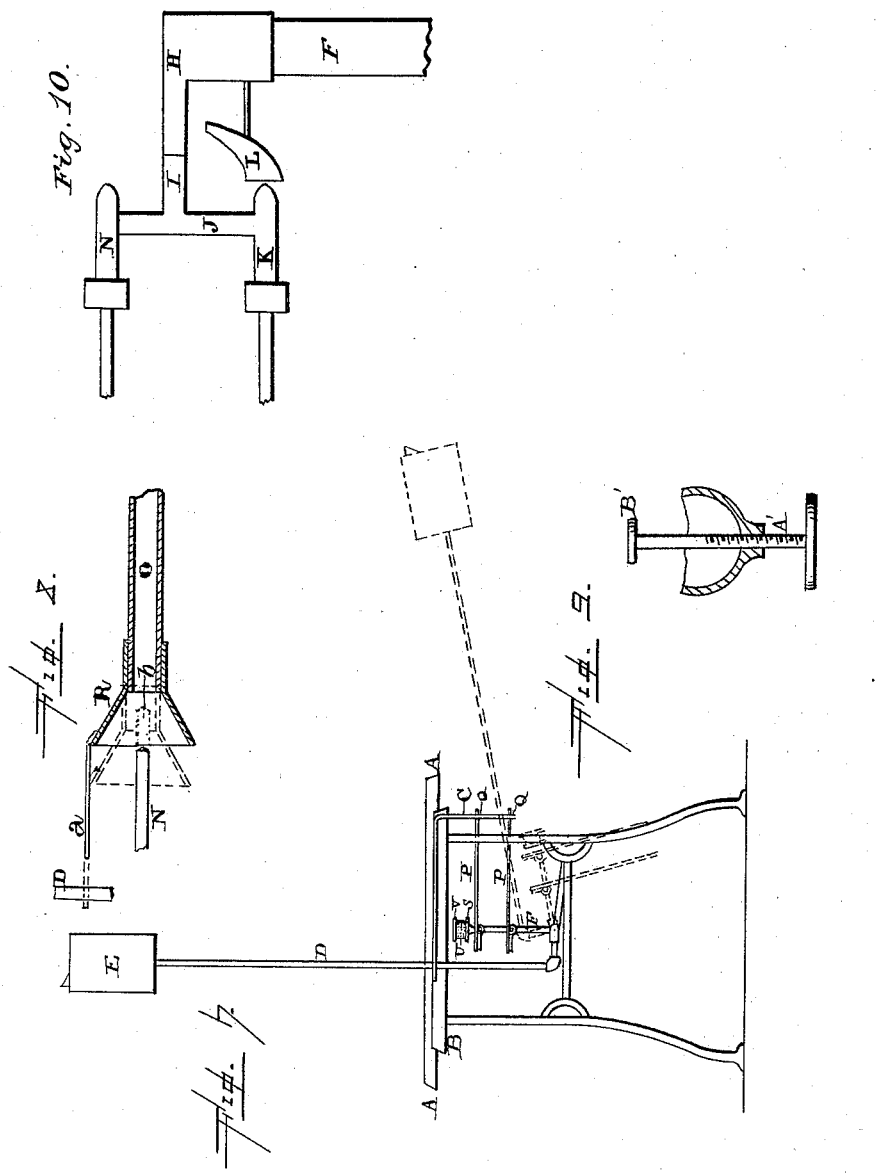

UNITED STATES PATENT OFFICE.

ZEBULON DAVIS, OF CANTON, OHIO.

VAPOR-STOVE.

SPECIFICATION forming part of Letters Patent No. 313,925, dated March 17, 1885.

Application filed January 15, 1884. (No model.)

*To all whom it may concern:*

Be it known that I, ZEBULON DAVIS, of Canton, in the county of Stark and State of Ohio, have invented certain new and useful Improvements in Vapor-Stoves; and I do hereby declare the following to be a full, clear, and exact description of the invention, such as will enable others skilled in the art to which it pertains to make and use it, reference being had to the accompanying drawings, which form part of this specification.

My invention relates to an improvement in vapor-stoves; and it consists, first, in the combination of a supply-pipe upon which two or more burners are secured, and each burner provided with a separate means of its own for regulating the supply of gas to it, with a means for generating the vapor, and a means for injecting the vapor, thoroughly mingled with air, into this feed-pipe so as to feed all the burners at once; second, the combination, in a vapor-burner stove, of the supply and mixing pipe, having one or more burners connected thereto, and each burner provided with an independent means of its own for regulating the supply of vapor to it, the vapor-generating chamber, a needle-barrel for producing the heating-flame for the chamber, and a needle-barrel for injecting the vapor into the supply and mixing pipe; third, the combination, in a vapor-burner stove, of the horizontal supply and mixing pipe, one or more burners connected thereto, each burner being provided with a valve of its own for regulating the supply of gas to it, a generating-chamber, and means for heating the chamber, and the needle-valve for injecting the gas into the horizontal pipe; fourth, the combination, in a vapor-burner stove, of the supply and mixing pipe, two or more burners connected thereto, and each burner provided with an independent means of its own for regulating the supply of vapor thereto, a vapor-generating chamber, and means for heating the chamber, means for injecting the gas into the supply-pipe, and the flaring-mouth section placed upon the pipe; fifth, in the combination and arrangement of devices, which will be more fully described hereinafter.

The object of my invention is to generate the vapor and then inject it, thoroughly mixed with air, into the feed-pipe, upon which a number of burners are placed, and thus supply each of the burners with gas, so that they can be lighted spontaneously, like gas-jets, each burner being independent of all of the others on the pipe.

Figure 1 is a perspective of a vapor-stove embodying my invention, part of the shell at one end of the stove being cut away, so as to show the operating parts underneath. Figs. 2, 3, 4, 5, and 6 are detail views of the burner. Fig. 7 is an end view of the stove, showing the tank turned over to one side for the purpose of being filled. Figs. 8 and 9 are detail views of modifications. Fig. 10 is an enlarged view of the generating apparatus.

A represents the frame of the stove, and B a shelf, which is either removable or permanently attached to the part A, as may be desired. This shelf is for the purpose of placing articles upon it over the generating-flame, to utilize its heat and thus keep them warm. To the outer end of this shelf B is secured the guide C, inside of which the feed-pipe D moves back and forth, as fully shown and described in my former patent. The feed-pipe D, which is secured to the tank E, extends downward to any suitable distance, and has the stand-pipe F secured thereto, as shown. This feed-pipe, carrying the stand-pipe and all of its attachments, is journaled in suitable bearings, G, so that when the tank is turned upon one side for the purpose of being filled the feed-pipe D, the stand-pipe, and all of its attachments are turned over upon their sides to a corresponding degree. It is only when all of these parts are thus turned upon their sides that the tank can be filled. Upon the top of the stand-pipe F is placed the flat generating chamber H, in which the vapor which supplies all of the burners and the heating-jet is generated. Extending from one side of the chamber H is a short pipe, I, which connects with the pipe J, at right angles thereto. At the lower end of the pipe J is the needle-barrel K, from which escapes the jet of gas which, passing through the curved pipe L, supplies the heating-jet which heats the chamber H for the purpose of vaporizing the oil. To the upper end of this pipe J is secured a second needle-barrel, N, from which escapes the jet of gas which passes into the supply and mixing-pipe O, upon which all of the burners are placed.

Both of the needle-barrels K N are controlled by the endwise-moving needles, which are pivoted to the operating-levers P, which extend outward any suitable distance. These levers P are to be operated entirely by hand both in opening and closing the needles. For the purpose of insuring that the needles shall be closed, and thus extinguish all the flame about the stove before the tank E can be filled, there is secured to the guide C the lugs Q, which extend out in the line of travel of the levers P when the stand-pipe F, and all of its attachments, and the feed-pipe are being turned for the purpose of bringing the tank upon its side in position to be filled. As the lugs Q project out in the line of travel of the levers P when the needles are open in the slightest degree, the levers will strike the lugs and prevent the tank and the parts connected thereto from being moved. When the levers P are moved so as to close the needles and extinguish all flames, the lugs no longer project out into their line of travel, so as to interfere with their lowering movement, and then all of the parts can be turned to allow the tank E to be filled. By thus providing the lugs Q to interfere with the lowering movement of the levers, ignorant or careless persons are compelled to extinguish all flame before the tank can be filled, and thus all possibility of accident is prevented, as nothing is left to their option or judgment. Upon the end of the supply and mixing pipe O is placed the sliding or stationary bell-mouth or flaring section R, which can be moved toward the point of the needle N, and thus made to encircle the needle, and cause sufficient air to be entrained with the escaping vapor to thoroughly oxygenate the vapor and produce a blue heating-flame. This section R is made movable upon the end of the pipe O, as shown in Fig. 8, so that when the tank and all the parts connected thereto are to be turned upon their sides the section R can be moved toward the burners and away from the needle-point, so as not to interfere with its turning movement. As this section R is movable upon the pipe O it may be connected, if so desired, to the bolt $a$, as shown in Fig. 8, which holds the feed-pipe in a vertical position, so that when the bolt is moved for the purpose of lowering the tank the section R will be pushed back along the pipe O clear of the needle-point. If preferred to make this section R stationary upon the end of the pipe O, an opening, $b$, will be made through its side, as shown in Fig. 8, so that when the parts connected to the tank are moved the needle-point N will pass through the opening in the side of the section when the tank is lowered. It is preferred, however, to make this section R movable upon the end of the pipe O, for then it can be moved to a greater or less extent around the end of the needle-barrel N, and thus entrain a greater or less supply of air, as may be preferred. The flaring portion of the section R is drawn closely around the needle-point, to protect the vapor from being disturbed by side currents of air, and at the same time to prevent the ignition of the jet of vapor from the heating-flame just below it. The jet of vapor in passing into the supply-pipe O becomes thoroughly mixed with air, and the vapor becomes oxygenated to such an extent as to furnish a gas that can be conveyed any suitable distance through the pipe O, and supply all of the burners as though the pipe O were connected to a supply of coal-gas.

In order to aid in the fixing of the vapor and the air, so as to produce a gas which can be conveyed a long distance through the pipe O without condensation, the section R is placed just over the generating-chamber H, where it and the adjoining pipe will be heated by the heating-flame. Where both the vapor and the air which is entrained are heated in this manner a more perfect gas is produced. This gas passes through the pipe O to each of the burners, and at any time that the valve which controls any one of the burners is opened the burner can be lighted like a gas-jet. By means of this construction it will readily be seen that the overflow-cup for each of the burners are entirely done away with, and that the gas for all of the burners is formed at the mouth of the section R. By thus doing away with the overflow-cups, and producing the gas for all of the burners at a common point, all of the trouble, delay, and smoke arising from heating and lighting the burners separately is done away with. By thus supplying gas to each of the burners any one or all of them can be lighted as readily as if they were gas-jets. If desired, one or more pipes O may be used, and where these pipes are fitted with the required means for supplying vapor to them the burners may be increased indefinitely, as greater or less capacity may be desired. Each one of the burners consists of the flat plate S, which is connected with the supply-pipe O by a short neck, and upon the top of this supporting-plate S is placed a suitable metallic frame, T, and the perforated combustion-ring U. The metallic frame T may consist of either a solid head, V, which is connected to the ring W by means of the standards X, or there may be two perforated rings connected together by the standards X, as shown in Fig. 6. Where the two rings W are used, a solid cap, Y, will be placed upon the top of the upper ring W after the perforated heating-ring U has been placed in position. The standards X are shaped, as shown in Fig. 2, with the sharp edge next to the inner side of the heating-ring, so as to permit a free passage of the vapor around the standards, and thus not interfere with the passage of the gas through the ring.

To permit a free passage of the vapor around the standards X, they may be hollowed out upon their outer edges, as shown in Fig. 5. The perforated heating-ring is slipped around over the standards X from one end, and then the whole burner is placed upon the supporting-plate S. Should the heating-ring become destroyed in the course of time by the heat, the metallic frame T can be lifted from the plate S, the ring U removed, and a new ring substituted at a trifling cost. By this construction a renewal of the burner can be made whenever desired or necessary. The supply of gas to each burner is controlled by the pivoted hand-lever Z, the vertically-moving sliding rod A', and the button-valve B'. The rod A' passes through a suitable stuffing-box, and is moved vertically by the lever Z for the purpose of raising the valve B' above the opening in the plate S or entirely closing the opening, so as to shut off the gas, as may be preferred. By thus controlling the supply of vapor to each burner separately the full force of the gas may either be concentrated upon one or two of the burners, or it may be divided between all of them, as may be seen fit. Where a very intense heat is required, the gas will be shut off from two of the burners, and thus have all of the gas consumed in one burner without having to regulate or alter the needle N, through which the gas-jet is supplied.

Instead of the sliding rods A' the button-valves B' may be connected to screw rods, if so desired, and the stuffing-box dispensed with, as shown in Fig. 9. As the rods move with but little friction they can be moved much more rapidly and conveniently than screws. Smooth sliding rods are preferred in connection with each of the button-valves B' and in connection with the jets N K.

In order to provide a light in connection with a vapor-stove, so that a light may be furnished at the same time, a gas-pipe, C', is connected to the supply-pipe O, as shown. While the vapor is passing into the pipe O it will flow freely through the pipe C', and, if permitted to escape at the gas tip, will produce an illuminating-flame.

I am aware that a gas-stove has been made in which a single pipe having a number of burners secured to it, and each burner provided with a cock of its own for the purpose of regulating the supply of gas to the burner, is not new, and this I disclaim.

I am also aware that a vapor-stove has been made in which a single burner has been placed upon the outer end of the pipe, and the vapor injected into the pipe; but in this case there has been but a single burner upon the pipe.

Having thus described my invention, I claim—

1. The combination, in a vapor-burner stove, of the supply and mixing pipe, two or more burners connected thereto, a vapor-generating chamber, and a means for injecting the vapor into the supply and mixing pipe, each one of the burners being provided with a means of its own for regulating the supply of gas to it, substantially as described.

2. The combination, in a vapor-burner stove, of the supply and mixing pipe, two or more burners connected thereto, and independent means for controlling the supply of vapor to each burner, and a vapor-generating chamber, a needle-barrel for producing a heating-flame for the chamber, and a needle-barrel for injecting the vapor into the supply and mixing pipe, substantially as set forth.

3. The combination, in a vapor-burner stove, of the horizontal supply and mixing pipe, two or more burners connected thereto, each burner being provided with a means for regulating the supply of gas to it, a vapor-generating chamber, a means for heating the chamber, and a needle-barrel for injecting the gas into the horizontal pipe, substantially as specified.

4. The combination, in a vapor-burner stove, of the mixing and supply pipe, two or more burners connected thereto, and independent means for controlling the supply of vapor to each burner, and a vapor-generating chamber, a means for heating the chamber, a means for injecting the gas into the supply-pipe, and a flaring-mouth section placed upon the pipe, substantially as shown.

5. In a vapor-burner stove, the combination of the levers P, connected with the needle-valves K N, the guide C, and the lugs or stops Q with the tank and the feed-pipe D, as set forth.

6. The combination of the reservoir, the feed-pipe and tank, the needle-barrels, needles, and devices for moving the needles with suitable stops which are secured to the frame, whereby the needles must be closed before the tank can be turned down to be filled, substantially as set forth.

In testimony whereof I affix my signature in presence of two witnesses.

ZEBULON DAVIS.

Witnesses:
F. A. LEHMANN,
A. S. PATTISON.